Patented July 30, 1935

2,009,587

UNITED STATES PATENT OFFICE 2,009,587

MEAT TREATING METHOD AND MEANS

Levi Scott Paddock and Richard W. Regensburger, Chicago, Ill., assignors, by mesne assignments, to Industrial Patents Corporation, Chicago, Ill., a corporation of Delaware No Drawing. Application April 13, 1931, Serial No. 529,886. In Canada September 11, 1929

2 Claims. (Cl. 99—8)

This invention relates to a method and to means for preserving the natural flesh color, appearance and condition of cut surfaces of fresh meat, such, for example, as beef rounds and quarters which normally, during chilling and transport, lose moisture and become dark in color. This application is a continuation in part of applicants' application for United States patent entitled "Method and means for preserving the natural color of cut surfaces of fresh meat", filed February 11, 1929, Serial No. 339,259.

An object of this invention is to provide a method and means by which fresh meat may be cut in a manner to produce pieces of desired size and shape requiring the production of cut surfaces of meat tissue and kept for extended periods of time thereafter without an appreciable change in the color, appearance or condition of the cut surfaces of said pieces.

Other objects of our invention are to provide a method for preventing any substantial change in appearance or condition of the cut surfaces of fresh meat; to provide a coating for the prevention of drying and darkening of the normally exposed cut surfaces of fresh meat; to provide an improved coating having germicidal ingredients therein which inhibit the growth of bacteria; to provide a protective coating which will prevent any material change in cut surfaces by providing a hermetic seal which will adhere to the surfaces of meat during normal handling; to provide a method for treating the cut surfaces of meat which will inhibit the growth of bacteria and avoid desiccation and oxidation.

For many years it has been found economically preferable to slaughter meat animals at central locations readily accessible to the source of production, to dress the animal at such point and ship the dressed meat to the consuming centers. Originally, beef animals destined to be consumed as fresh meat, without pickling, salting or smoking, were shipped alive and slaughtered by or near the retail meat dealer who sold the meat to the consumer. The advent of the refrigerator car permitted the slaughter of beef animals near the point of production, the dressed carcass rather than the live animal being shipped to the consuming center. The center of the beef slaughtering and dressing industry in the United States is in the Middle West at such concentration points as Chicago, Kansas City and Omaha. It was very early found that for convenience in handling and transportation the beef carcass should be subdivided. In the first instance, this was done by splitting the backbone, dividing the carcass into two sides. The subdivision was later carried one step further by dividing each side in half, resulting in quarters. The division into quarters was effected by cutting through the rib, exposing a cut surface of meat at this point. As time went on, it was found that various Eastern consuming centers demanded different portions of the carcass, necessitating still further subdivision. At the present time, perhaps more than three-fourths of the beef slaughtered at Middle Western packing plants for shipment to Eastern consuming centers is divided into such small divisions as rounds, chucks, and quarters. It will be readily seen that such subdivision results in exposure of two or more cut surfaces. For years, many millions of pounds of beef so subdivided has been shipped annually.

It might be well at this point to note that cattle, hogs and sheep comprise the greater proportion of the meat diet of the American people. Sheep, being small, are conventionally dressed by removing the pelt, head, feet and entrails and are sold without subdividing the carcass. Hogs are conventionally cut into many portions, much of which is used in the production of lard and such preserved meats as salt pork, hams and bacon. Cattle, on the other hand, are ordinarily sold to the consumer as fresh beef, a negligible quantity of beef being cured or smoked for consumption.

This invention relates particularly to fresh beef. Although it may be used with cooked or cured meats, this invention is intended mainly to accomplish the different purpose of preserving the bloom on cut surfaces of fresh meat, more especially beef. It should be borne in mind that there is a very real difference between fresh meat and smoked or cured meat and that there is a very real difference between the cut surface of meat and any other surface. In the case of beef, for instance, all portions of the carcass are covered with either fat or other non-muscular tissue. It is only the cut surface to which this invention applies. The cut surface is apt to darken, to lose moisture, to spoil and to deteriorate by reason of exposure within a very short time after cutting. Inasmuch as beef ordinarily is not consumed sooner than ten to fifteen days after subdivision into the wholesale cuts, it often becomes necessary for the wholesaler or retailer in the Eastern markets to trim the cut surfaces of the beef, resulting in considerable waste. In the aggregate, this waste amounts to a tremendous loss, in view of the many millions of pounds of beef shipped in the form of wholesale cuts. It is one of the purposes of our invention to eliminate this waste, to minimize shrinkage, and to permit delivery to the consumer of beef in its natural fresh and wholesome condition.

Fresh meat, such as beef, differs very materially from smoked or cured meat, such as conventional smoked hams. In the first place, deterioration of fresh meat is retarded by refrigeration, the object of which is to retain the product without change. On the other hand, smoked or cured meat is preserved by means of permeating and saturating the tissue with preservative agents, the object of which is to prevent deterioration of the product in the absence of refrigeration. The surface of smoked meat, for example, is covered with a pyroligneous deposit during the smoking. It is darkened and purposely dried so that the original condition is changed, the outer surface being rendered rather unpalatable. In the second place, smoked meat is ordinarily separated from other portions of the carcass before treatment, usually on lines that do not run across the grain of any substantial portion of non-fatty muscular tissue. Although other non-comminuted products are sometimes smoked, it should be noted that in general, smoked meats are pork products. Fresh meat, especially beef, when subdivided into wholesale cuts for transportation, is ordinarily cut across the muscular grain which permits the loss of moisture through the natural oozing out of the meat juices and subsequent evaporation.

Any method of preserving the natural color and condition of the cut surfaces of fresh meat must avoid any such preserving action as would tend to alter in any way, the character or condition of the meat at the surface. If the cut surface of the fresh meat be preserved by a coating, it is essential of course that such coating be easily removable without affecting the appearance or contour of the cut surface. It is essential that such coating adhere to the surface during normal handling, and in this connection, it might well be noted that normal handling is sometimes not synonymous with gentle or careful handling.

Bacteria are usually present upon the cut surface. If the meat is promptly and thoroughly chilled after slaughter, refrigeration sufficiently inhibits the growth of bacteria to avoid decomposition of products during normal storage periods. However, it has been found that the cut surface of beef deteriorates very quickly in spite of refrigeration.

Part of this deterioration is probably due to oxidation. Certainly part is due to desiccation and it would appear that a substantial part is due to bacterial action, the conditions for bacterial growth being apparently more favorable at the surface. In this connection it would seem that the constant oozing out of meat juices would carry additional bacteria from the interior to the surface, causing a concentration of bacteria at this point. It has been known for many years that smoked and cured meats may be treated with coatings in order to avoid the growth of moulds upon the surface and to avoid attack by insects and rodents. Applicants are familiar with such patents as the patent to Roth, No. 1,025,925, the patent to Fitzgerald, No. 1,048,675 and the patent to Mitchell, No. 654,118, and other teachings of a similar nature. The teachings of Mitchell, Roth and Fitzgerald and other workers in that field relate to smoked and preserved meats and the like. In some instances, these workers were attempting to develop insecticides and rodent repellants. In other words, they were seeking to avoid the growth of moulds on cured meats. In no instance were they concerned with preserving the natural original color and condition of a cut surface of meat. These workers were dealing with products which had already been treated with preservatives and which had not been further subdivided to expose cut surfaces.

This invention is directed to that elusive bloom or color which characterizes the freshly cut meat surfaces and causes it to stand out as untreated, unpreserved and unchanged in the ordinary sense of these terms. Many attempts have been made to solve the problem which is inherent in exposing the cut surface of meat and then holding for any considerable time after such surface has been exposed. Applicants have made extensive experiments in this connection and believe that a satisfactory solution of the problem involves several factors.

In the first place, loss of moisture must be prevented, first to avoid shrinkage of the product and second to avoid drying out and hardening of the cut surfaces. Any change of color is to be avoided whether or not accompanied by drying out. Bacterial action must be avoided or inhibited to prevent decomposition of the surface. The natural bloom must be preserved inasmuch as a varnished appearance is just as objectionable as a darkened or dried out appearance. If a coating is used, it must be easily removable without pulling away any appreciable portion of the meat.

One example of a coating which we have discovered which may be used with satisfactory results involves the presence of small quantities of essential oils in coatings of this class, to prevent spoiling and to preserve the natural fresh color and appearance of freshly cut surfaces of meat. Essential oils also prevent bacterial growth on the surface of the meat and in the materials comprising the coating. Various essential oils, such as oil-of-cloves, may be used in the coating, either individually or in combinations, such as a mixture of oil of black pepper, coriander and allspice. Active agents comprising other volatile oils having germicidal and condimental properties may also be used. In one particular embodiment of our invention, a solution is made containing 57% water, 25% glycerin, 18% gelatin and substantially 0.1% essential oil.

This solution may be applied with a brush or spraying device on cloth placed on the cut surface of the meat. The entire piece of meat may be wrapped in fabric such as export beef cloth or the fabric may be applied only on the cut surfaces. The coating is then allowed to congeal. In this particular coating, the glycerin, being hygroscopic, preserves the gelatin in a flexible condition, thus avoiding cracking. The essential oil as already mentioned, acts as a germicide. The gelatin acts as a hermetic seal. The fabric serves a double purpose. In the first place, when the mixture is applied, it serves as a binder or framework to permit even distribution of the congealable liquid, which is placed upon the fabric while hot and fluid and facilitates removal. Cooling congeals the liquid into a flexible rubber-like substance. Upon application, some of the liquid is absorbed by the threads of the fabric. Some of the liquid fluid finds its way through the interstices, which vary in size with different fabrics, of course depending upon the size of the mesh. In the case of the particular mixture which has just been described, it has been found by experimentation that if a fabric as fine as muslin be used the coating does not adhere well and in ordinary handling comes loose entirely or in part, forming air pockets at which points the surface of the meat will darken and otherwise deteriorate. If fabric with as wide a mesh as cheese cloth for example be used, the covering cannot be removed without tearing and damaging the meat. A fabric having a mesh about midway between muslin and cheese cloth, such for example as export beef cloth, gives the best results with the particular moisture which has just been described. It will be seen that the fabric serves to permit the formation of a multiplicity of points of adhesion, the number and extent of such points of adhesion being governed by the size of the mesh. Very fine mesh permits insufficient extent of the points of adhesion. Wide mesh permits too great adhesion. It is, of course, a matter of experimentation to determine the size of the mesh necessary to give the best results with any particular mixture. We have discovered that a fabric or fabric-like substance must first be placed in contact with the cut surface for the application of the congealable adhesive coating in order to control the extent and tenacity of adhesion. It will be noted that the points of adhesion are small in any event and that they are close together, the distance between being occupied by a thread which has absorbed the coating material and is held in contact with the surface of the meat by means of the adjacent points of adhesion. We have successfully altered the composition of the coating by substituting glucose, for example, for glycerin.

Glucose, like glycerin, acts as a hygroscopic agent to keep the gelatin flexible. The adhesive and hermetic qualities of the gelatin are not materially affected by the substitution of glucose for glycerin. A satisfactory mixture of a coating in which glucose is used would be water 61%, gelatin 20%, glucose 15% and essential oil 0.1%. Common salt in minute quantities, for example, 4%, may be added for its germicidal effect, in which case the quantity of essential oil may be reduced.

It will be readily seen that any equivalent of glycerin or glucose may be used, such as sugar, glycol, dextrine, gums and resins, (natural or synthetic). Another mixture which would give reasonably satisfactory results consists of water 62%, gelatin 21%, sugar 13% and essential oil 0.1%

Although we have given specific examples in this specification, it will be understood that our invention is a broad one and in its broadest aspect directed to the preservation of the freshly cut appearance of the cut surface of meat. The examples in this embodiment of our invention are given by way of example, and not by way of limitation, and various changes in the details and ingredients of the several mixtures and the methods set out may be made without departing from the spirit of this invention as defined in the following claims.

We claim:

1. As an article of commerce, the combination of a piece of fresh meat refrigerated to a temperature sufficiently low to prevent substantial bacterial propagation having a portion of its surface provided by the natural fat or non-muscular tissue and another portion provided by the exposed muscular tissue of an untreated cut surface, and a covering for said muscular tissue cut surface in intimate contact therewith throughout its entire area maintained against displacement by adhesion to said surface but capable of being forcibly removed without destructive effect to said muscular tissue or altering the original freshly cut appearance thereof, said covering being capable of maintaining for prolonged periods of time, the original color, appearance and condition of said cut surface without appreciable change and comprising a fabric of open texture applied to said cut surface in intimate contact therewith and a congealable solution containing an essential oil having germicidal properties on said fabric with portions thereof projecting through the openings in said fabric and in adhesive contact with said cut surface.

2. The process which consists in cutting fresh meat as a part of the slaughtering and dressing operation, to provide pieces of the desired size and shape having a portion of their surfaces composed of the natural fat or non-muscular tissue and another portion composed of the exposed muscular tissue of an untreated cut surface, then within a period of time thereafter insufficient to permit substantial bacterial propagation or any change in the color, appearance and condition of said cut surface and without otherwise treating said cut surface, applying fabric having openings therethrough in intimate contact with said cut surface, and a covering on top of said fabric, comprising a congealable liquid containing an essential oil having germicidal properties and causing portions of said covering to extend through the openings in said fabric and adhere to said cut surface and hold the entire covering and fabric in intimate contact with the entire area of said cut surface, and thereafter without substantial delay refrigerating said pieces to a temperature sufficiently low to prevent substantial bacterial propagation, and finally maintaining said low temperature and said covering in such contact until further processing is required preparatory to retail sale and/or consumption.

LEVI SCOTT PADDOCK.
RICHARD W. REGENSBURGER.